(12) United States Patent
Chen et al.

(10) Patent No.: US 7,878,398 B2
(45) Date of Patent: *Feb. 1, 2011

(54) COUNTERFEIT AND TAMPER RESISTANT LABELS WITH RANDOMLY OCCURRING FEATURES

(75) Inventors: Yuqun Chen, Seattle, WA (US); Darko Kirovski, Kirkland, WA (US); Yacov Yacobi, Mercer Island, WA (US); Gideon A. Yuval, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/391,155

(22) Filed: Feb. 23, 2009

(65) Prior Publication Data

US 2010/0044438 A1   Feb. 25, 2010

Related U.S. Application Data

(63) Continuation of application No. 10/789,904, filed on Feb. 27, 2004, now Pat. No. 7,497,379.

(51) Int. Cl.
 *G06K 7/10* (2006.01)
(52) U.S. Cl. .................................. 235/454; 713/179
(58) Field of Classification Search ................ 235/380, 235/462.01, 462.07, 462.09, 462.1, 462.11, 235/462.24, 462.41, 491, 494, 454
See application file for complete search history.

(56) References Cited

U.S. PATENT DOCUMENTS

| 4,386,233 A | 5/1983 | Smid et al. |
| 4,424,414 A | 1/1984 | Hellman et al. |
| 4,567,600 A | 1/1986 | Massey et al. |
| 4,633,036 A | 12/1986 | Hellman et al. |
| 4,820,912 A | 4/1989 | Samyn |
| 4,881,264 A | 11/1989 | Merkle |
| 4,956,863 A | 9/1990 | Goss |
| 5,003,597 A | 3/1991 | Merkle |

(Continued)

FOREIGN PATENT DOCUMENTS

CN   1279849 A   1/2001

(Continued)

OTHER PUBLICATIONS

Brzakovic et al, "Document Recognition/Authentication Based on Medium-Embedded Random Patterns", Proceedings of the Second International Conference on Tsukuba Science City, Japan, Oct. 20-22, 1993, pp. 95-98.

(Continued)

*Primary Examiner*—Michael G Lee
*Assistant Examiner*—Kristy A Haupt
(74) *Attorney, Agent, or Firm*—Lee & Hayes, PLLC

(57) ABSTRACT

Techniques are disclosed to enable utilization of randomly-occurring features of a label (whether embedded or naturally inherent) to provide counterfeit-resistant and/or tamper-resistant labels. More specifically, labels including randomly-occurring features are scanned to determine the labels' features. The information from the scan is utilized to provide identifying indicia which uniquely identifies each label and may be later verified against the label features that are present to determine whether the label is genuine. In a described implementation, the identifying indicia may be cryptographically signed.

20 Claims, 13 Drawing Sheets

U.S. PATENT DOCUMENTS

| | | | |
|---|---|---|---|
| 5,016,274 | A | 5/1991 | Micali et al. |
| 5,299,262 | A | 3/1994 | Brickell et al. |
| 5,337,361 | A | 8/1994 | Wang et al. |
| 5,384,846 | A | 1/1995 | Berson et al. |
| 5,388,158 | A | 2/1995 | Berson |
| 5,420,924 | A | 5/1995 | Berson et al. |
| 5,469,506 | A | 11/1995 | Berson et al. |
| 5,864,622 | A | 1/1999 | Marcus |
| 5,974,150 | A | 10/1999 | Kaish et al. |
| 6,035,914 | A | 3/2000 | Ramsey et al. |
| 6,193,156 | B1 | 2/2001 | Han et al. |
| 6,536,665 | B1 | 3/2003 | Ray et al. |
| 6,749,110 | B2 | 6/2004 | Hecht |
| 7,010,167 | B1 | 3/2006 | Ordowski et al. |
| 7,089,420 | B1 | 8/2006 | Durst et al. |
| 7,152,047 | B1 | 12/2006 | Nagel |
| 7,497,379 | B2 * | 3/2009 | Chen et al. ............ 235/454 |
| 2001/0010333 | A1 | 8/2001 | Han et al. |
| 2003/0006285 | A1 | 1/2003 | Hecht |
| 2005/0131900 | A1 | 6/2005 | Palliyll et al. |

FOREIGN PATENT DOCUMENTS

| | | |
|---|---|---|
| DE | 10204870 | 8/2003 |
| EP | 0889448 | 1/1999 |
| EP | 1173001 | 1/2002 |
| RU | 2195021 C1 | 12/2002 |
| WO | WO9119614 | 12/1991 |
| WO | WO9917486 | 4/1999 |
| WO | WO0143086 | 6/2001 |

OTHER PUBLICATIONS

"Certificate Authority Technology" SC Infosecurity News Magezine pp. 42-43 Feb. 1999.

Chang, "Robust Image Authentication Using Content Based Compression" Multimedia Systems vol. 9 No. 2 Aug. 2003.

"Counterfeit Deterrent Features for the Next-Generation Currency Design", Naitonal Materials Advisory Board (NMAB), 4-Description and Assessment of Deterrent Features, pp. 39-86.

"Counterfeit Deterrent Features for the Next-Generation Currency Design (1993)", National Materials Advisory Board (NMAB); Appendix E: Methods for Authentication of Unique Random Patt . . . pp. 117-120.

Min-hui, "An Image Self-Verification Scheme Based on Rehash Technique" 2003 International Conference on Communication Technology vol. 2 pp. 1883-1886 Apr. 2003.

Pappu, R., "Physical One-Way Functions", www.sciencemag.org, Vo. 297, Sep. 20, 2002, pp. 2026-2030.

Pennebaker et al, "An Overview of the Basic Principles of the Q-Coder Adaptive Binary Arithmetic Coder", IBM Journal of Research and Development, vol. 32, No. 11, Nov. 1988, pp. 717-726.

Rey, "A Survey of Watermarking Algorithms for Image Authentication" EURASIP Journal on Applied Signal Processing vol. 2002 No. 6 pp. 613-621 Jun. 2002.

Rivest, R.L., et al., "A Method for Obtaining Digital Signatures and Public-Key Cryptosystems", 15 pages.

Rivest, R., "The MD5 Message-Digest Algorithm", MIT Laboratory for Computer Science and RSA Data Security, Inc., Apr. 1992, 18 Pages, http:/www.faqs.org/rfcs/rfc1321.html.

Simmons, "Identification of Data, Devices, Documents and Individuals", Proceedings of the Annual International Carnahan Conference on Security Technology, Taipei, Oct. 1-3, 1991, p. 208.

"Using Biometrics for Border Security" General Accounting Office (GAO document 03-174) Nov. 2002 242 pages.

* cited by examiner

SHOT 1

SHOT 2

COUNTERFEIT AND TAMPER RESISTANT LABELS WITH RANDOMLY OCCURRING FEATURES

RELATED APPLICATION

This application is a continuation of and claims priority to U.S. patent application Ser. No. 10/789,904, filed on Feb. 27, 2004, the disclosure of which is incorporated by reference herein.

TECHNICAL FIELD

The present invention generally relates to counterfeit-resistant and/or tamper-resistant labels, and more particularly, to utilizing randomly occurring features of a label (whether embedded or naturally inherent) to limit unauthorized attempts in counterfeiting and/or tampering with the label.

BACKGROUND

Counterfeiting and tampering of labels cost product marketers and manufacturers billions of dollars each year in lost income and lost customers. With the proliferation of computer technology, generating labels that resemble the genuine item has become easier. For example, a scanner may be utilized to scan a high-resolution image of a genuine label which can then be reproduced repeatedly at a minimum cost. Also, coupons may be scanned, modified (e.g., to have a higher value), repeatedly printed, and redeemed.

Various technologies have been utilized to stop the flood of counterfeiting and tampering in the recent years. One way labels have been secured is by incorporation of bar codes. Bar codes are generally machine-readable code that is printed on a label. Using a bar code scanner, the label with a bar code may be quickly read and authenticated. One problem with current bar coded labels is that an identical label may be used on various items.

Another current solution is to have the scanned bar code examined against secure data stored in a database (e.g., a point of sale (POS) system). This solution, however, requires incorporation of up-to-date data from a marketer (or manufacturer) and store. Such a solution requires timely and close cooperation of multiple entities. Also, such a solution limits its implementation flexibility and may not always be feasible.

These technologies, however, share a common disadvantage; namely, the labels scanned are physically identical for a given product. Accordingly, even though the manufacturing process for creating the legitimate labels may be highly sophisticated, it generally does not take a counterfeiter much time to determine a way to create fake pass-offs. And, once a label is successfully copied a single time, it may be repeatedly reproduced (e.g., by building a master copy that is replicated at low cost). Even if a label is black-listed in a database after a given number of uses, there is no guarantee that the labels that are scanned first are actually the genuine labels.

Accordingly, the current solutions fail to provide labels that are relatively hard to copy and inexpensive to produce.

SUMMARY

Techniques are disclosed to enable utilization of randomly-occurring features of a label (whether embedded or naturally inherent) to provide counterfeit-resistant and/or tamper-resistant labels. More specifically, labels including randomly-occurring features are scanned to determine the labels' features. The information from the scan is utilized to provide identifying indicia which uniquely identifies each label and may be later verified against the label features that are present to determine whether the label is genuine. In a described implementation, the identifying indicia may be cryptographically signed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes techniques for providing tamper-resistant and/or counterfeit-resistant labels. The labels contain a random pattern of physical features that are either naturally inherent or are intentionally embedded. This pattern is unique to each label and may not be exactly duplicated at a reasonable cost (i.e., a desirable property for a counterfeit-resistant label). Information about this unique pattern is cryptographically signed and either printed on the label, stored in an accompanying readable device such as a smart chip, or provided remotely (e.g., through a database).

When verifying the authenticity of such a label, one need only scan the physical pattern and validate whether it matches the signed information. Public-key cryptography permits the verification of the signed information using a public key without revealing the corresponding private secret key that is used for signing.

Also, both manufacturing and verification of the labels require inexpensive and off-the-shelf components in an implementation, and are resistant to a variety of operational errors as well as natural wear and tear in the labels. Furthermore, a compression solution is described which permits encoding of the scanned label pattern efficiently.

Fiber Optic Strands

Figure 1:
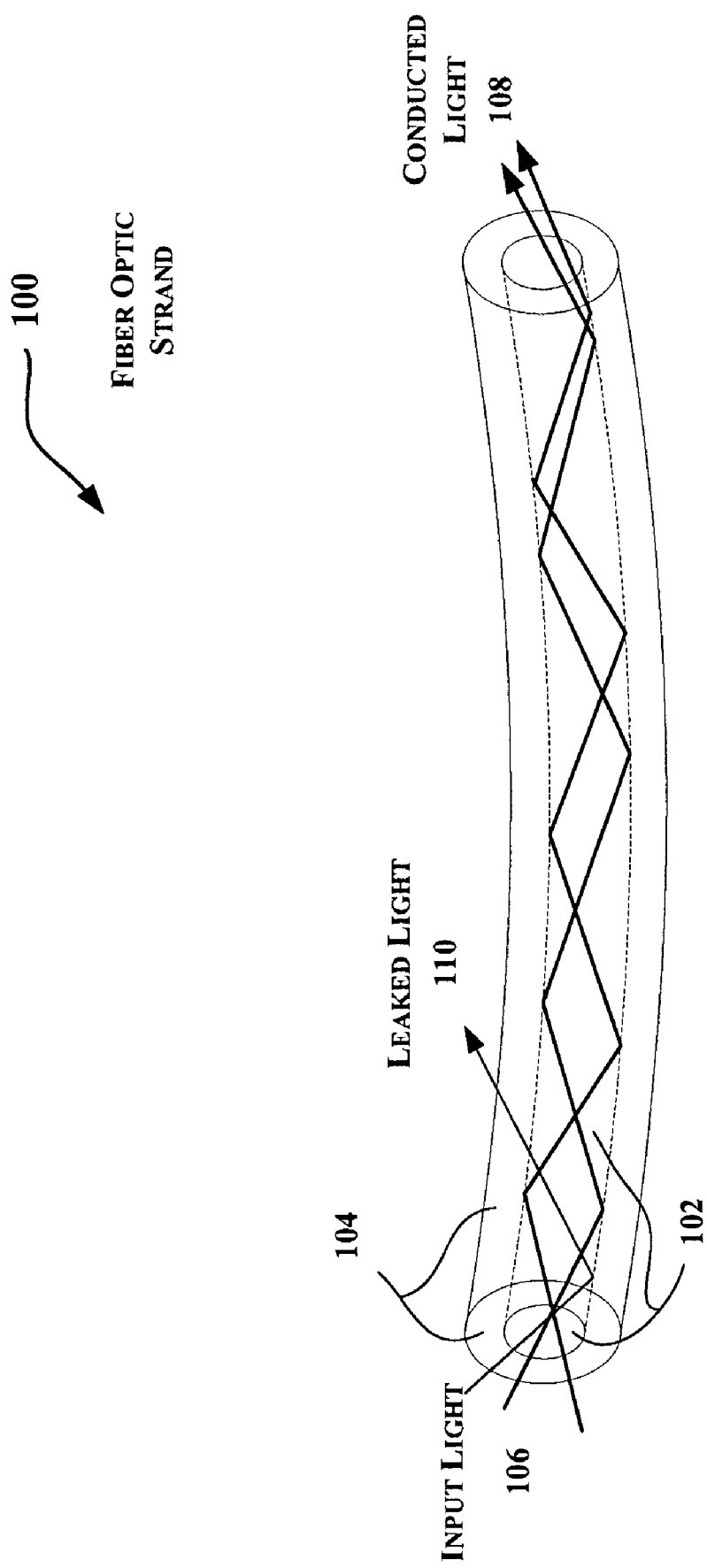
FIG. 1 illustrates an exemplary side view of a fiber optic strand.

FIG. 1 illustrates an exemplary side view of a fiber optic strand (100). Fiber optic strands (also referred to as fiber optic strands) such as that illustrated in FIG. 1 may be utilized in various implementations to provide counterfeit-resistant and/or tamper-resistant labels (as will be further discussed herein with reference to the remaining figures). The fiber optic strand 100 may be made of glass or plastics and includes a core portion 102 and a coating layer 104. The coating layer 104 is generally thinner than the core portion 102. Moreover, the thickness of some current fiber optic strands may be as small as one micron.

The coating layer 104 has a higher refractive index than the core portion 102 to conduct input light rays (106) through the fiber optic strand without much leakage (108). Occasionally, a light ray may enter the fiber core at such a sharp angle that it may hit the coating layer 104 at an incident angle that is above a critical value. In this case, the light ray leaks out of the fiber optic strand (110). Generally, the amount of leakage is negligible for most optical fibers. Even lighting-grade optical fibers (readily available at hardware stores) that are of poorer quality (but much cheaper) than communication-grade fibers tend not to generate noticeable light leakage.

Labels with Fiber Optic Strands

Figure 2:
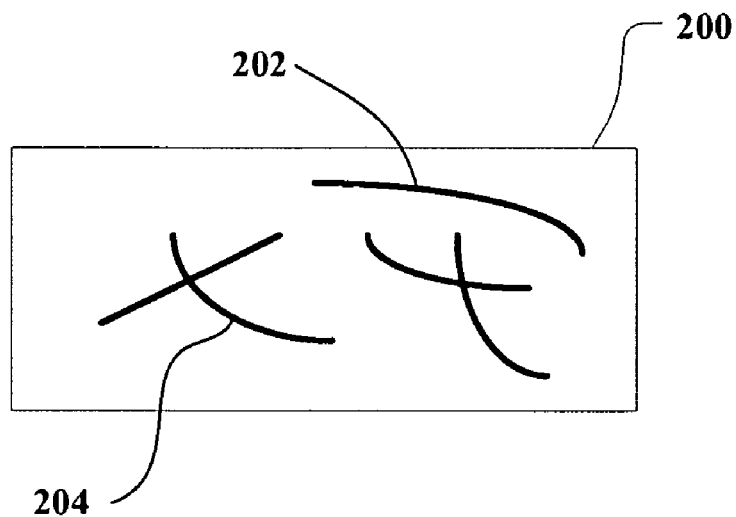
FIG. 2 illustrates an exemplary label with optical fiber strands.

FIG. 2 illustrates an exemplary label 200 with optical fiber strands (e.g., 202 and 204). The optical fiber strands may have different lengths, thicknesses, colors, and the like to provide varying features, for example, while illuminated. In an implementation, the optical fiber strands may be cut, mixed, and embedded into the label 200. For example, different types of fiber optic strands (e.g., having different thicknesses, colors, florescence, and the like) may be cut at different lengths and thrown in a bin to be mixed. The mixed fiber optic strands may then be sprayed with a transparent and protective substance (e.g., with clear glue or a resin such as an epoxy resin) onto a medium to form randomly-embedded optical fibers on the medium.

In an implementation, the transparent and protective substance is envisioned to limit movement of the fibers to ensure that the label maintains its randomly occurring features. The medium may be precut or cut after the embedding stage. Also, the medium may be made of paper, plastic, fabric, and the like. In one implementation, the medium is flexible to allow durability of the label, for example, after it is attached to a flexible material or product packaging.

Figure 3:
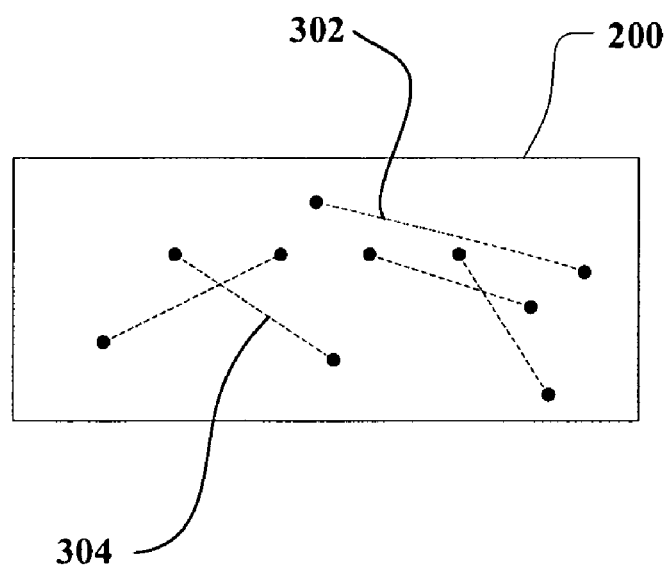
FIG. 3 illustrates an exemplary mathematical representation of physical fiber optic properties corresponding to the label shown in FIG. 2.

FIG. 3 illustrates an exemplary mathematical representation of physical fiber optic properties corresponding to the label 200 of FIG. 2. In FIG. 2, each optical fiber strand of the label 200 may be represented by a pair of points (e.g., two ends of the fiber strand) and a dotted line connecting the two points. For example, the fiber optic strands 202 and 204 are represented by the pairs 302 and 304, respectively. Accordingly, an optical fiber strand can be simply considered as a pair of two ends of a light tunnel.

In one implementation, the coordinates of the two ends of each fiber optic strand on a label are utilized as randomly occurring features to provide counterfeit and/or tamper resistant labels. However, it is envisioned that other features of the fiber optic strands may also be utilized such as the strands' curvatures, relative light intensities, florescence, colors, thicknesses (e.g., as measured by the width of the strands at each end), and the like. In an implementation, the two ends of each fiber optic strand may be made visible by illuminating the label to determine the coordinates.

These coordinates constitute the unique property of a medium laden with random optical fibers. If the fibers are laid randomly in a medium, these coordinates may be utilized as random numbers. Furthermore, conventional copying techniques are incapable of reproducing the light-conducting characteristics of optical fibers. The labels with embedded fibers are hence relatively difficult to replicate. These two properties, uniqueness and copy resistance, may be utilized in provision of counterfeit and tamper resistant labeling solutions as will be further discussed herein, for example, with respect to FIGS. 4-6.

Secure Label Production and Verification

Figure 4:
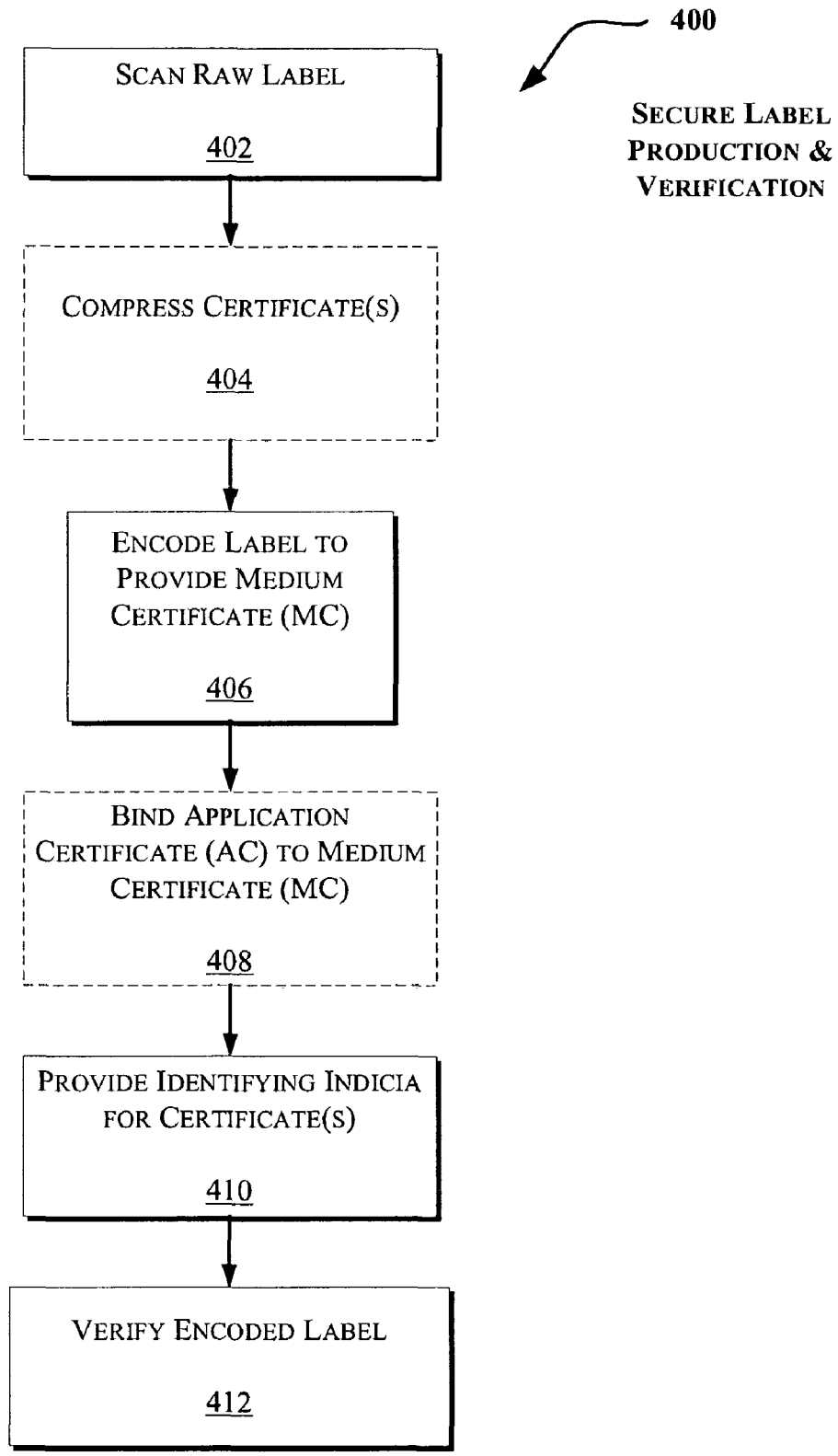
FIG. 4 illustrates an exemplary counterfeit and tamper resistant label production and verification method.

FIG. 4 illustrates an exemplary counterfeit and tamper resistant label production and verification method 400. The method 400 scans a raw label (402) such as those discussed with reference to FIGS. 2 and 3 to provide data regarding physical features of the raw label (e.g., the coordinates of the ends of fiber optic strands present on a label). The scanned data may be optionally compressed (404) to lessen the required storage capacity as will be further discussed below with respect to the section entitled "fiber data compression." The data from the scanned raw label (402) is encoded (406) to provide a cryptographic medium certificate (MC). The medium certificate is envisioned to securely identify the unique fiber patter on the label. In one implementation, the medium certificate may be cryptographically signed with a private key as will be further discussed with reference to FIG. 5.

An application certificate (AC) may be optionally bound to the label and/or medium certificate (408), for example, to provide application-specific data (e.g., a serial number, authorization code, check amount, and the like). In an implementation, the application certificate may be cryptographically signed with an application-specific private key as will be further discussed with reference to FIG. 6. Accordingly, each label may be encoded with two certificates (i.e., the medium and application certificates).

Identifying indicia for one or more certificates (i.e., the medium and application certificates) are provided (410). The identifying indicia may be provided as a one-dimensional or two-dimensional bar code, a smart tag (e.g., radio frequency identity (RFID) or a smart chip), and the like. The indicia provision may be done directly on the label or remotely such as through a database that may contain correlation data linked to the physical label pattern, medium certificate, and/or application certificate. The encoded label (e.g., such as provided through the identifying indicia) may then be verified (412), for example, by validating the medium and/or application certificate(s) (e.g., with a medium and/or application-specific public key) as will be further discussed with reference to FIG. 8.

Universal Label Production

Figure 5:
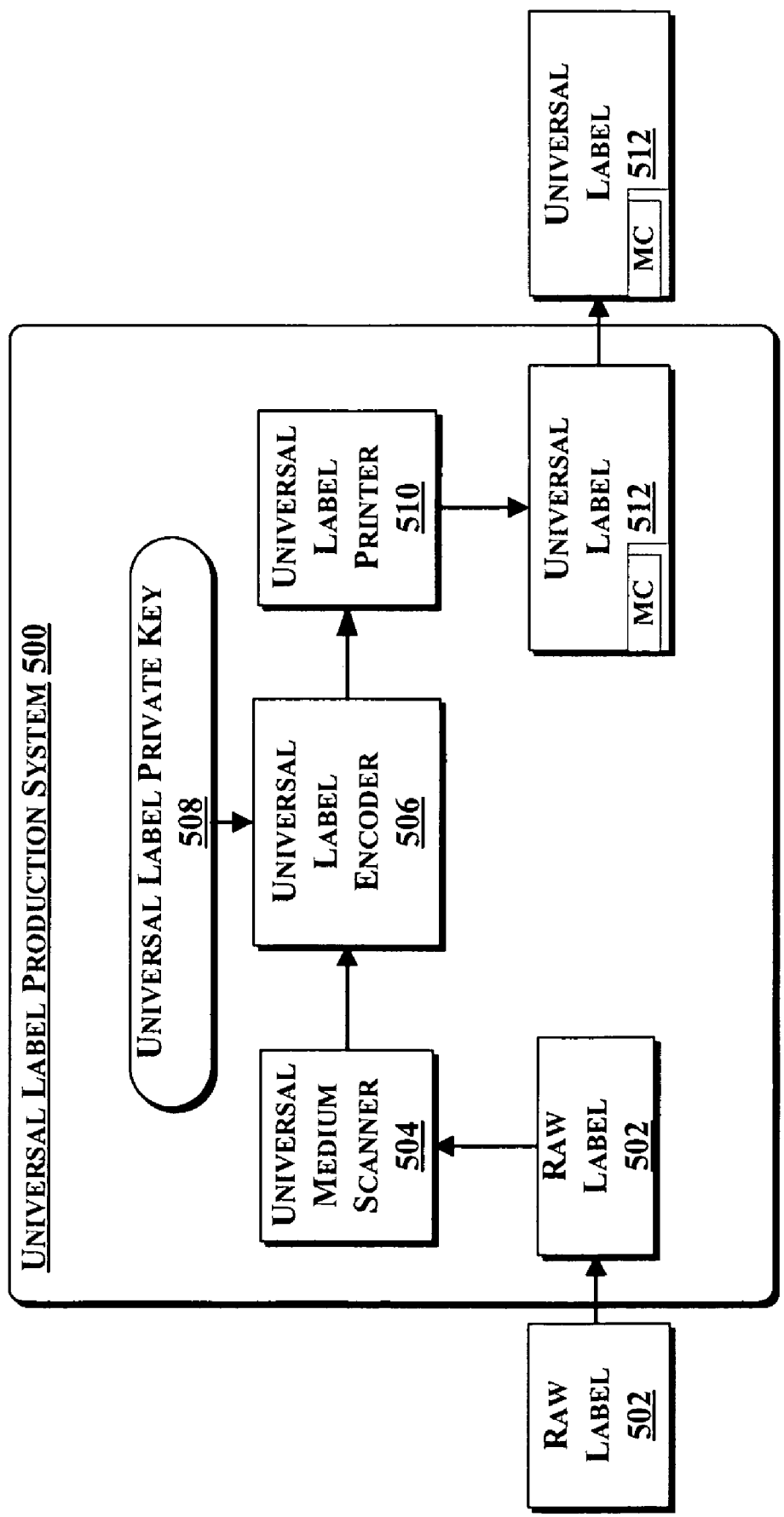
FIG. 5 illustrates an exemplary universal label production system.

FIG. 5 illustrates an exemplary universal label production system 500. The system 500 processes a raw label (502) (e.g., the label discussed with respect to FIG. 2) and produces a cryptographically-strong certificate of the underlying fiber strand pattern. The raw label (502) passes under a universal medium scanner (504) which analyzes the pattern of fiber strands present on the label and produces a set of geometric data (e.g., coordinates) that corresponds to this pattern. The pattern data is fed to a universal label encoder (506) to generate a cryptographic medium certificate (MC) which securely and unambiguously identifies the unique fiber pattern on the label (such that discussed with reference to the stage 404 of FIG. 4). Accordingly, there is a one-to-one correspondence between the certificate and the label. In an implementation, generating this certificate requires a private key (508) that may only be available at the site where the universal labels are made.

The label's certificate (e.g., MC) is then sent to a universal label printer (510), which can be any off-the-shelf printer, to print the certificate directly on the label itself to produce a universal label with a certificate (512). As discussed with reference to FIG. 4, the certificate may be printed as one-dimensional or two-dimensional barcode. It can also be embedded in a smart tag (such as RFID), in which case the universal label printer (510) is a smart tag writer. Accordingly, the final product is a universal label (512) that contains a cryptographic label medium certificate (MC).

In one implementation, the universal label (512) is a self-certifying entity in that the medium certificate is uniquely and unmistakably bound to the label. Not knowing the medium private key, a counterfeiter may not produce a universal label with a valid medium certificate. This key property allows an application vendor to extend a universal label to an application-specific, self-authenticating application label as will be further discussed with reference to FIG. 6.

Application Label Production

Figure 6:
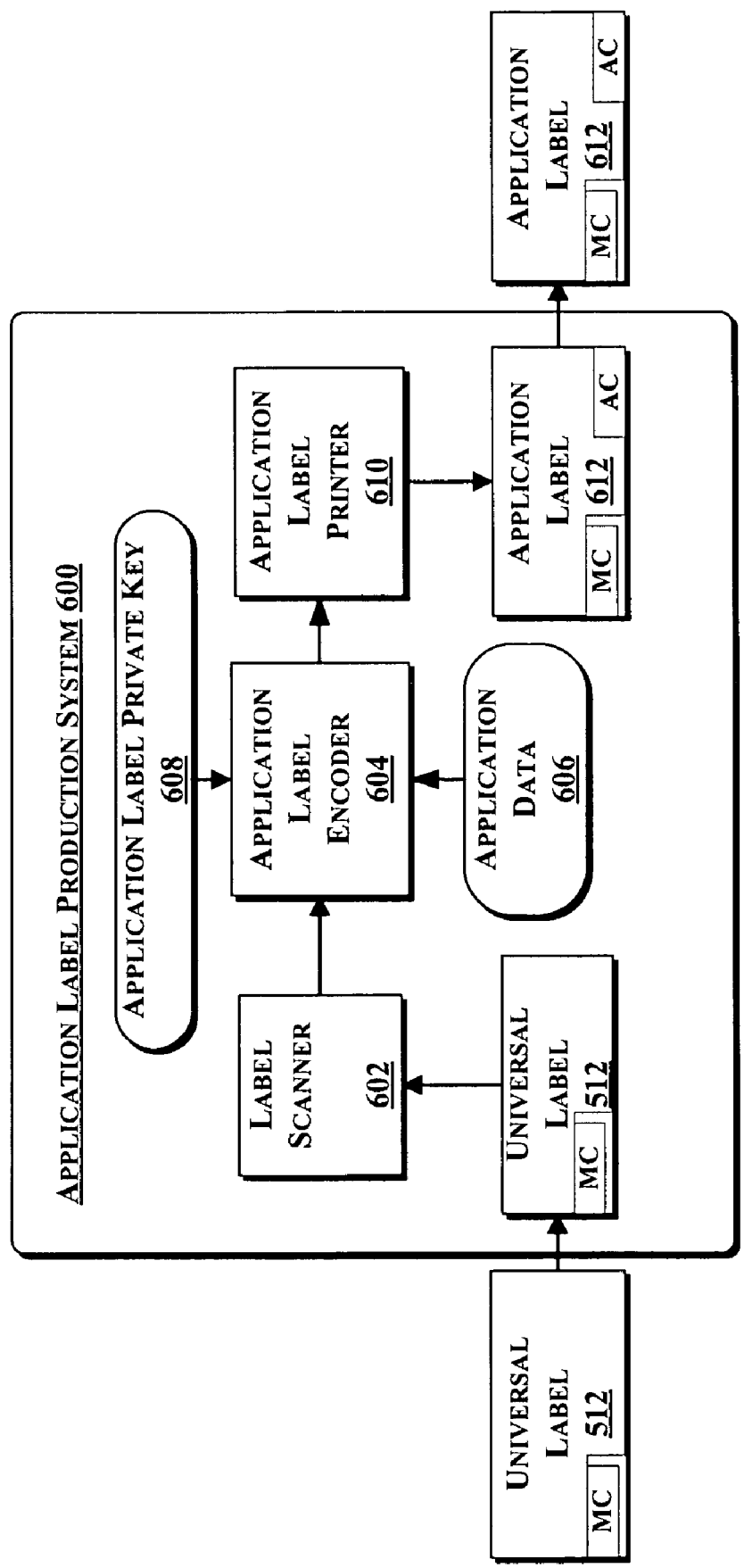
FIG. 6 illustrates an exemplary application label production system.

FIG. 6 illustrates an exemplary application label production system 600. The application label can either produced by a separate vendor or by the same vendor that produces the universal label. A label scanner (602) reads the medium certificate (MC) from the universal label (512). The scanner may or may not validate the medium certificate against the fiber pattern embedded in the label. The medium certificate (MC) is then sent to an application label encoder (604), which takes the application data (606) (for example, a serial number for a product or the numeric information on a cashier's check) and a vendor-specific private key (608) and generates a cryptographically-strong application certificate (AC). The application certificate uniquely and securely identifies the application data and the medium certificate (and henceforth the physical label itself). This certificate is then printed (or embedded) on the label itself by an application label printer (610) (or remotely as discussed with reference to the stage 410 of FIG. 4).

The application label (612) thus produced contains two certificates: a medium certificate (MC) and an application certificate (AC). Together they uniquely and securely bind the application data to the physical label. An application certificate that binds the label medium with the application data is very useful. For example, a bank check manufacturer can produce blank cashier's checks that come with authentic label medium certificates. When issuing a cashier's check, a bank can simply generate an application certificate that embodies the label medium certificate as well as the amount and payee of the check. A counterfeiter will not be able to duplicate the check since it is extremely hard to duplicate the fiber pattern. Also, the counterfeiter won't be able to generate his own universal checks with appropriate label medium certificates, because he does not possess the universal-label private key (508). Furthermore, he won't be able to print his own cashier's check even if he possesses blank checks with authentic medium certificates, because he lacks the bank's private key (608).

Application Certificate Generation

Figure 7:
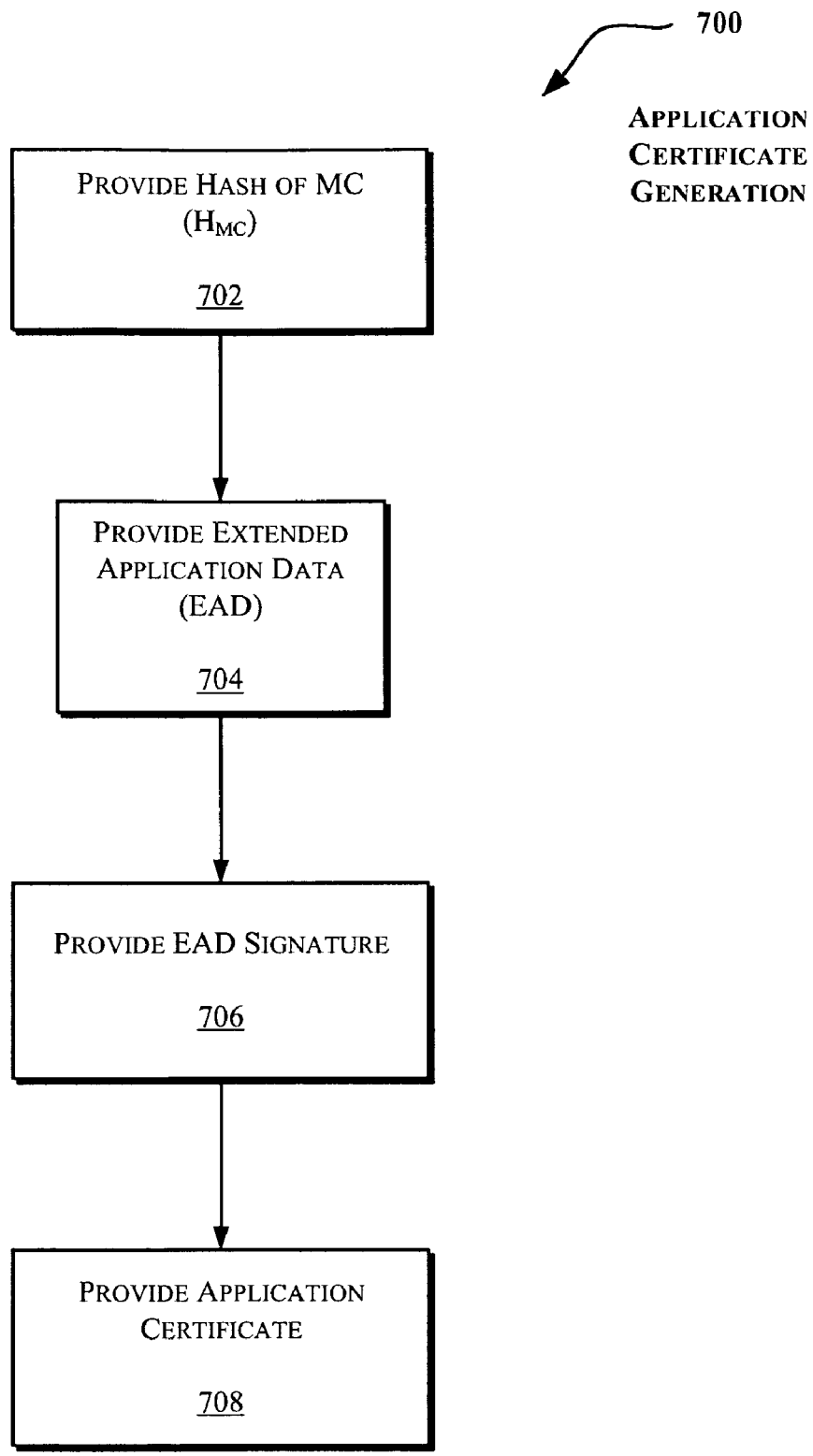
FIG. 7 illustrates an exemplary application certificate generation method using a cryptographic hash function.

FIG. 7 illustrates an exemplary application certificate generation method 700 using a cryptographic hash function (e.g., message digest 5 (MD5)). Of course, other cryptographically strong hash functions or encryption would work. The application label encoder (604) takes the hash of the label medium certificate ($H_{MC}$) 702, appends the hash value ($H_{MC}$) to the application data (AD) 606 to form extended application data (EAD) (704). The application-label private key $K_{appl-priv}$ (608) is used to produce a cryptographic signature of EAD ($SIG_{EAD}$) (706). The application certificate (AC) may then be provided (708) by concatenating the application data (AD), the hash of the medium certificate ($H_{MC}$), and the EAD signature ($SIG_{EAD}$) (e.g., $AC=AD+H_{MC}+SIG_{EAD}$).

Label Verification

Figure 8:
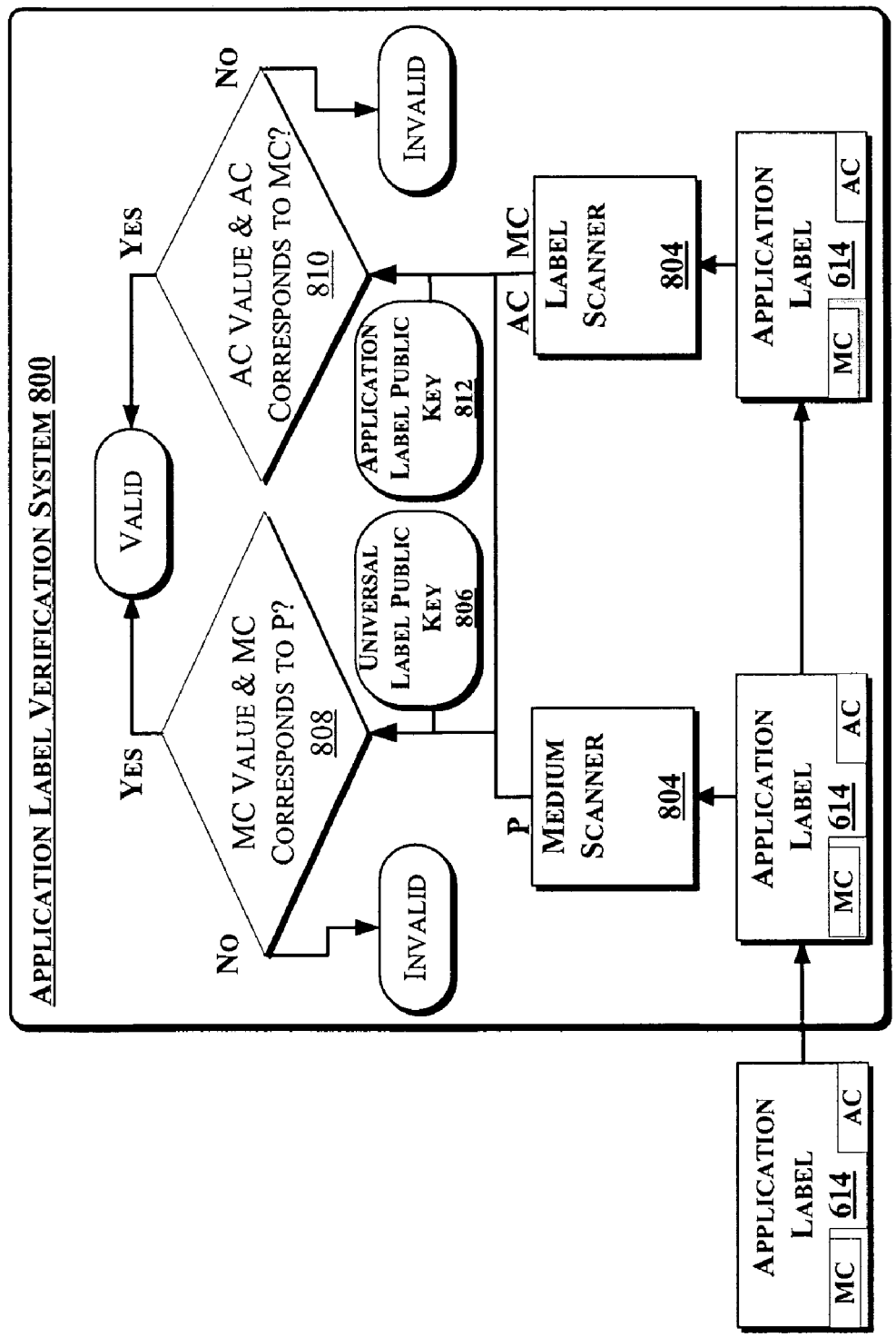
FIG. 8 illustrates an exemplary label verification system.

FIG. 8 illustrates an exemplary label verification system 800. In an implementation, the system 800 utilizes a two-stage verification process. First, the system 800 verifies the application certificate against the medium certificate. Second, the system 800 verifies the medium certificate against the physical label. Although these two stages are logically independent, in practice they may be implemented in a single device.

The verification system 800 includes two scanners: a medium scanner (802) and a label scanner (804) (bar code scanner or a smart tag scanner such as an RFID reader if the certificates are stored in an RFID chip). The medium scanner (802) may be the same as the universal medium scanner 504 discussed with reference to FIG. 5. The scanners 802 and 804 retrieve the fiber pattern (P), the medium certificate (MC), and the application certificate (AC) from the application label (614).

The medium certificate (MC) is validated using a universal label public key (806) and checked against the fiber pattern (P) (808). If either check fails, the label is pronounced as invalid. Also, the application certificate (AC) is validated (810) using an application public key (812). In addition, the correspondence of the application certificate (AC) with the medium certificate (MC) is also verified (810). In particular, if the method for generating an application certificate described with reference to FIG. 7 is used, verification of the application certificate entails validating that the EAD signature ($SIG_{EAD}$) corresponds to the application data (AD) and the hash of the medium certificate ($H_{MC}$) and that $H_{MC}$ corresponds to the medium certificate (MC). The label is declared genuine if the label passes the test 810, and fake otherwise.

Cost of Counterfeiting

The private keys for generating valid medium and application certificates are assumed to be securely kept out of the reach of the counterfeiters. The only remaining viable way for a counterfeiter to produce an authentic-looking fiber-based label, one that can pass the verification procedure described with respect to FIG. 8, is to replicate an existing genuine label almost exactly, which means to replicate the pattern of optical fibers found in a genuine label. The cost of replication has three components: the cost to set up a replication system (the setup cost), the cost to replicate a label (replication cost), and the cost to acquire the patterns of genuine labels (pre-master cost).

The setup cost, $COST_{setup}$, is a one-time cost. Its magnitude depends on the sophistication of the machinery that will be created for counterfeiting purpose. The per-label replication cost, $COST_{replication}$, is a recurring cost. There is a roughly inverse relationship between $COST_{setup}$ and $COST_{replication}$. Generally, the cruder the replication machinery, the more time-consuming and expensive it is to replicate an individual label.

In one extreme case, replication of a genuine label is done carefully by hand. The setup cost is practically zero; while the replication cost can be very high as the counterfeiter needs to hire human beings to place fiber strands at exact positions. Against these crude counterfeiters, a legitimate label manufacturer can force $COST_{replication}$ to be arbitrarily high (and time-consuming) by simply increasing the number of fiber strands in each label.

In another extreme case, a counterfeiter can produce a highly-sophisticated machine that automatically cuts fibers to the desired lengths and places them at exact locations as in the genuine labels. Such a machine will undoubtedly cost hundreds of thousands or even millions of dollars. In either case, the amortized cost per replicated label is necessarily high for the counterfeiters, while the cost per label is extremely low for legitimate manufacturers. Cost-benefit analysis would indicate that it is much less profitable to counterfeit mass-market products at a large quantity.

Furthermore, since each genuine label is unique due to the nature of random embedding of fiber strands, the presence of two or more identical physical labels (with the same medium certificate) unambiguously reveals that the labels are counterfeits. In order to evade detection, a counterfeiter is forced to acquire many fiber patterns from genuine labels so as to ensure that there is enough variety of fiber patterns in a shipment. The pre-master cost, $COST_{master}$, increases roughly proportionally with the number of counterfeit copies. Therefore, purchasing legitimate products is a fairly expensive way to obtain pre-master fiber patterns and certificates. Also, taking away the legitimate copies (without payment or theft) involves criminal organizations and may be tracked down if the product labels are registered in a database throughout the distribution channels.

The cost analysis indicates that it is very difficult for anyone with little or moderate resources to counterfeit the fiber-based labels and that large-scale counterfeiting is economically impractical and risky due to the high cost, human time, and sometimes criminal activities involved. In short, the label system significantly raises the barrier to profitable counterfeiting.

Exemplary Application Scenarios

Since the label systems discussed herein ensure that each individual label is unique and very hard to duplicate, these labels are suitable in a wide variety of applications that require counterfeit resistance and/or tamper resistance.

In general, the techniques described herein are applicable to any labels or label-like entities that are susceptible to wide-scale counterfeiting. Examples include personal and bank checks, bank notes (e.g., currencies), product labels such as certificate of authenticity for software products and labels for drugs, and IDs such as driver's license and passports.

Product Labels. Counterfeiting is costing most major industries, for example, software, apparel, and pharmaceutical industries, billions of dollars in lost revenues. Poor qualities of counterfeit products threaten to endanger the unsuspecting consumers.

This problem is representatively acute in the pharmaceutical industry where a counterfeit drug may lead to a life-threatening situation. The techniques discussed herein are suited for making the counterfeit-proof label of authenticity for mass-market products. For example, assume that a company Perfect Health has a proprietary drug X to sell through pharmacies around the world. Perfect Health purchases from a third-party label manufacturer Universal Labels a large quantity of fiber-embedded universal labels, each stamped with a medium certificate as described with reference to FIG. 5. Universal Labels is an established, trustworthy vendor of security labels. Its public key for verifying medium certificates is registered with a trust-worthy third-party entity.

Perfect Health stamps a product-specific application certificate on each universal label, using the method discussed with reference to FIG. 6. It then puts such a label of authenticity into each bottle (box) of drugs that it distributes to the pharmacies. In addition, Perfect Health also purchases from Universal Labels a number of verification systems (see, e.g., FIG. 8) and configure them to use its own public key for verifying application certificates. Some of these devices are installed at pharmacies where Perfect Health's drug X is sold.

Consumers and the pharmacies are encouraged to scan their drug X packages using the installed verification devices to ascertain the authenticity of the packages. Moreover, the verification devices are linked to a global database so that whenever a consumer verifies a Perfect Health's drug package, the embedded application certificate (or the serial number) is registered with the database.

A counterfeit package that reuses a thrown-away label of authenticity from Perfect Health will be immediately caught when another consumer tries to verify his counterfeited or tampered purchase. Perfect Health gives the remaining verification devices to private investigators and law enforcement agencies such as the U.S. Customs. The consumers are now able to verify the authenticity of their Perfect Health drugs at any store. The law enforcement agencies have more confidence in their raids on suspicious drug shipments and warehouses.

Identification. Fake identifications cause many security concerns. A few prominent examples include driver's licenses, passports, employment authorization cards, and employee identification cards. The techniques described herein can make it very difficult to counterfeit IDs, while keeping the additional cost very low.

For example, the U.S. government can manufacture passports using special paper with optical fibers embedded within. One or more pages in the passport, or a small section on these pages, are marked as labeling area. Whenever a U.S. citizen requests a passport, the government generates a passport certificate that binds to the passport's fiber pattern in the labeling area. The certificate is directly printed on the passport or stored on a memory chip embedded in the passport.

At immigration checkpoints, the government employs the afore-described verification devices to check the authenticity of the passports. Compared with a cryptography-based passport wherein the passport holder's information is securely encoded on the passport, such a scheme makes sure that a counterfeiter cannot produce an exact copy of an existing passport. The government can simply increase the number of fibers embedded in the passport and the accuracy of the verification device to make it nearly impossible to physically duplicate a genuine passport. Hence, impersonation using a fake passport may be eliminated.

Also, a lost passport can be dealt with by registering the passport's serial number (which may be included in the passport's application certificate) with the government's database that can be easily queried by the verification device.

Bank Notes. Counterfeiting of bank notes (or currencies) poses a significant danger to a sovereign's economical and social stability. Many security features have been introduced in recently design currencies. However, most of these new features can be scanned and copied by a sophisticated counterfeiter. With the techniques described herein, it is straightforward to create a secure bank note (such as discussed with reference to FIG. 6). A bank note verifier (e.g., built in the same or similar way as depicted in FIG. 8), can be purchased by most shops due to its relatively low cost. The verifier can also be built into vending machines.

Bank and Personal Checks. A fiber-embedded check cannot be easily forged. When a bank issues a cashier's check using the techniques described herein, the check's data such as payee, amount, and the issue date, can be encoded in the application certificate. Doing so prevents a person from either duplicating or making his own cashier's checks.

For example, a customer X requests her bank Y to issue a cashier's check for D amount, leaving the payee blank. Bank Y prints the check on a blank universal check that contains a medium certificate. The blank check is manufactured by a well-known vendor Z. Bank Y also prints on the check the application certificate that includes the information about customer X and the amount D. The application certificate is encoded using the bank's private key K1. Customer X then sends the check to an entity U. U can now validate the check using the blank check vendor Z's public key and bank Y's public key.

Accordingly, the customer cannot duplicate the check twice for the reasons outlined previously (e.g., with reference to FIG. 6). The cryptographically-strong application certificate also prevents the customer from making her own bank checks.

Legal Documents. Original documents are often required by the legal community. Currently signatures serve as the primary means for distinguishes between original and fake documents. These documents are nonetheless prone to forgery. The print paper may be embedded with optical fibers (e.g., available from a paper vendor). A law firm can simply print a legal document on such paper and stamp an application certificate that includes important information about the document, i.e., date, time, parties involved, etc.

Anti-Tampering Applications. A fiber-based label may be considered irreplaceable in that an identical label is extremely difficult to make. This property makes the labeling systems discussed herein highly suitable for applications that desire evidence of tampering.

For example, a shipping container can be sealed with fiber-embedded labels (or tapes). The shipping company and/or the authority such as the customs and port authority can print additional certificates on the sealing labels to indicate that the content has passed certain inspection. The seals may be attached such any attempt to break open the container would necessarily damage the seals. At the destination, the customer, the port authority, or the shipping company's local station can use a verification device (e.g., such as that discussed with reference to FIG. 8) to check whether the sealing label is original to find out if the container has been tampered with.

Tamper-evident container seals can add values to regular shipping companies. They can also be used for securing cross-ocean shipments to improve national security.

Label Scanner System

In an implementation, only one of the two fiber strand openings is illuminated at a time. As a result, each fiber strand may be represented by four coordinates (e.g., two for each opening of the strand because the label surface is two dimensional), e.g., relative to an arbitrarily chosen origin. Accordingly, a complete map (or capture function) of an optical fiber pattern may be written as:

$$M^4(P)=\{(x_1^1,y_1^1,x_1^2,y_1^2),\ldots,(x_n^1,y_n^1,x_n^2,y_n^2)\}$$

In the above formula, $(x_k^1,y_k^1, x_k^2,y_k^2)$ is the coordinate for $k^{th}$ fiber strand and P is the fiber pattern on the label. As shown, there is a one-to-one correspondence between the optical-fiber pattern and its map. The superscript 4 in $M^4$ denotes the fact that the complete map of an optical-fiber pattern is a four-dimensional function, because four coordinate numbers are required to fully describe the geometric position of a single fiber strand (if the shape of the fiber strand is ignored).

One drawback of the $M^4$ capture function is that it requires sophisticated scanning devices. More specifically, in order to capture the full coordinate of a fiber strand, one has to illuminate one of the two fiber strand openings at a time. Illuminating an area of the label that is larger than the size of a fiber tip results in reduced measurement accuracy as well as false readings because more than one fiber stands may be illuminated at the same time. Therefore, the $M^4$ capture function requires the use of a very small spot light. The spot light can be moved across the surface of the label.

Alternatively, the small spot lights can be simulated using a fixed grid of tiny light sources. The former method increases the cost of the scanner since a precise motor may need to be used to actuate the spot light. Also, it may drastically increase the time it takes to capture a fiber pattern as the spot light needs to cover the label surface in fine stages. This method also requires expensive lighting components to maintain high measurement accuracy. For example, in order to measure the fiber coordinates to within ½ millimeter, a light source needs to be placed in each ¼ square millimeter. This is a relatively more expensive and un-scalable proposition.

In various implementations, two methods may be utilized for scanning fiber-embedded labels while maintaining efficiency and counterfeit-resistance (and/or tamper-resistance): fixed partition scanning and sweep-line scanning. In the fixed partition scanning, the label is divided into imaginary tiles that are individually illuminated in succession. In the sweep-line scanning, two scans of the same label are made. The data captured by each scan is correlated. These two methods will be further discussed below with reference to FIGS. 9 and 10.

Fixed Partition Scanning

Figure 9:
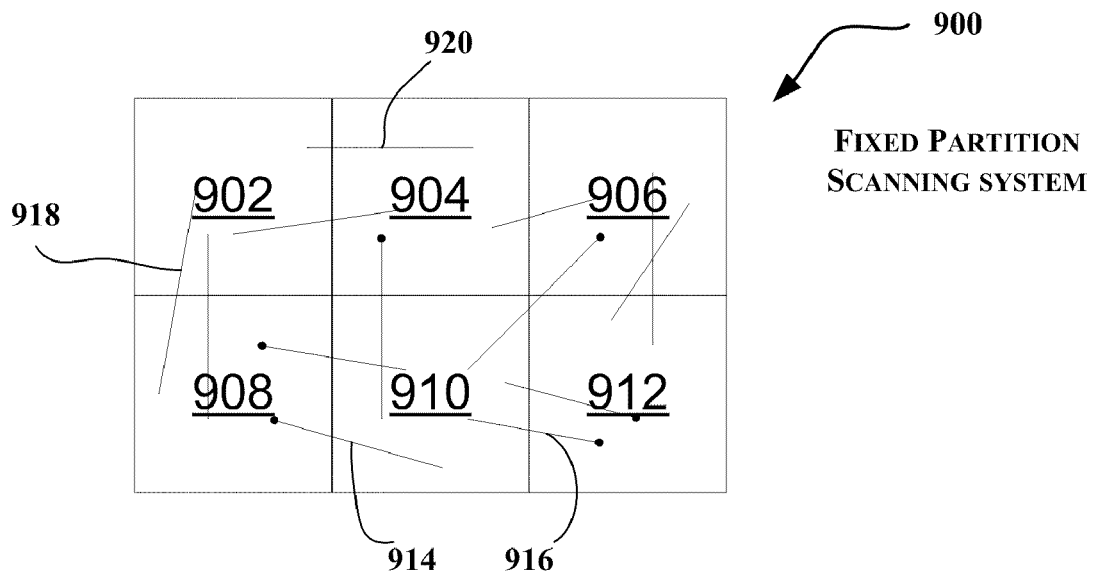
FIG. 9 illustrates an exemplary system for fixed partition scanning.

FIG. 9 illustrates an exemplary system 900 for fixed partition scanning. As illustrated, a label may be divided into M-by-N imaginary tiles (2 by 3 in FIG. 9). The tiles (902-912) are individually illuminated in succession. One of the tiles (910) is illuminated while the other tiles (902-908 and 912) remain in dark. The fiber openings that are lit appear in tiles 904, 906, 908, and 912, and are represented by small dots (e.g., 914 and 916). The fiber openings that are unlit appear in tiles 902, 904, 906, 908, and 912, and are represented by lines with no dots at the ends (e.g., 918 and 920).

The scanner for this arrangement consists of M-by-N scanning blocks; each block may contain a camera and one or more lighting devices. The blocks may be separated by opaque walls, so that light from the block illuminating a subdivision (or the on block) are not leaked into the other dark blocks (or the off block). Successively, each of the M-by-N scanning blocks turns on its internal lights (which is called an exposure), while others keep their lights off and capture the lit fiber openings with their cameras. The result of this scanning process, the sub-division capture $M^{sub-div}(P)$ function, can be expressed as follows:

$$M^{sub-div}(P)=\{L_1,L_2,\ldots,L_{M\times N}\},$$

In the above formula, $L_k$ is the list of coordinates of fiber openings when the lights in $k^{th}$ imaging block are lit, $L_k=\{C^1_k,C^2_k,\ldots,C^q_k\}$, where $C^i_k(i\neq k)$ is the list of coordinates of fiber openings captured in $i^{th}$ imaging block when the k block is illuminated, and $C^i_k=\{(x^1_{k,i},y^1_{k,i}), (x^2_{k,i},y^2_{k,i}),\ldots\}$.

As discussed with reference to FIG. 9, the sub-division capture function can be implemented using a set of cameras and light bulbs. Since each imaging block covers a relatively small area, low resolution cameras, such as consumer webcams, suffice, thereby reducing the total system cost. In the sub-division scan, the reduction function R is applied to each list of fiber coordinates, captured during each exposure:

$$R(M^{sub-div}(P)) = \{R(C^2{}_1), R(C^3{}_1), \ldots, R(C^i{}_k), \ldots\},$$

In the above formula, $C^j{}_k (i \ne k)$ is the data captured by $i^{th}$ imaging block during $k^{th}$ exposure.

The verification process involves comparing the data obtained during each exposure. Suppose R(M(P)) is obtained when manufacturing the label and R(M'(P)) is obtained in the field, the label may be declared genuine if and only if $R(C^i{}_k) = R(C'^i{}_k)$, for all pairs of (i,k), $i \ne k$.

In implementations where compression and/or hashing is applied to the fiber data, the reduction function R is applied to each list of fiber coordinates, captured during each exposure. Exemplary compression techniques are further discussed below with respect to the section entitled "fiber data compression."

In the case where the reduction function R is the identity function, $R(A) \equiv A$, verification is tantamount to comparing $C^i{}_k$ with $C'^i{}_k$, for all pairs of (i,k), $i \ne k$. Each $C^i{}_k$ may be a set of points expressed in a two-dimensional coordinate system that is local to an imaging block. Comparing $C^i{}_k$ with $C'^i{}_k$ is a matter of matching two point sets in one implementation. The two point sets may be declared as equivalent if and only if there exists a rigid motion transformation T(rotation,translation,perspective skew) such that at least P number of points in $C^i{}_k$ have unique match points in $C'^i{}_k$, and P represents a large fraction of number of points in both $C^i{}_k$ and $C'^i{}_k$. Therefore, given two sets of exposure data M and M', where $M = \{C^i{}_k,$ for i and k, $i \ne k\}$ and $M' = \{C'^i{}_k,$ for i and k, $i \ne k\}$, M and M' are considered equivalent with respect to a matching error radius c and matching percentage p if the following is true:

For all pairs of i and k, where i represents the exposure block and k represents the imaging block, there exists a rigid-body camera transformation T such that:
1. There are D number of points $\{p_1, p_2, \ldots, p_D\}$ in $C'^i{}_k$ that satisfy a matching criteria: There exist a set of D points $\{q_1, q_2, \ldots, q_D\}$ in $C^i{}_k$ such that $\|q_j - T(p_j)\| < \epsilon$, where $\|x - y\|$ denotes the $L^2$ distance between points x and y.
2. $D > \rho \cdot (|C^i{}_k| + |C'^i{}_k|)/2$, where $|X|$ denotes the number of points in set X.

Finding the rigid-body camera transformation T may be performed by application of techniques such as star-constellation matching, point-pattern matching, and the like.

Sweep-Line Scanning

The sweep-line scanning improves upon the fixed-partition scanner by dynamically scanning the label surface in a one-dimensional movement. As such, it may be more robust against counterfeiting attacks.

Figure 10:
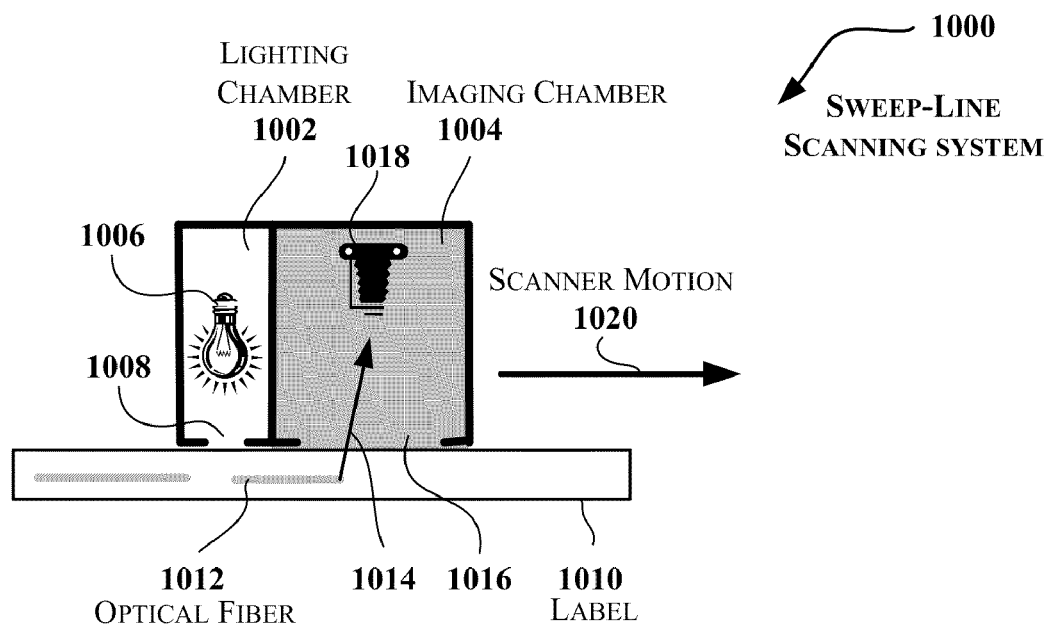
FIG. 10 illustrates an exemplary side-view of a sweep-line scanning system.

FIG. 10 illustrates an exemplary side-view of a sweep-line scanning system 1000. The system 1000 includes a lighting chamber (1002) and an imaging chamber (1004). The lighting chamber (1002) may contain a number of green ultra-bright light-emitting diodes (LEDs) (1006) to intensely illuminate a narrow rectangular strip (i.e., an illumination window 1008) on the label (1010). The light goes through the fiber strands (1012) whose ends lay inside the illumination window (1008) and shows up in the area under the imaging chamber (1014) (such as in an imaging window 1016). The positions of the lit fiber ends are captured by a consumer-grade video camera (1018). In addition, the imaging chamber (1004) contains a number of low-intensity red LEDs (not shown) that may constantly illuminate the label surface (1010). The guide patterns may be used to accurately position the fiber ends from the captured video data.

In an implementation, all illumination LEDs (e.g., green and red) are left on as the scanner is moved across the label surface in one direction (1020). The video camera (1018) takes continuous shots of the area of the label that lies directly in the imaging window (1016). The captured video data contains the label surface under red illumination and lit fiber ends in green. Of course, other combination of colors (or the same color) may be utilized to illuminate the guides and/or fiber ends. The video data is fed to a computer (such as the computing environment discussed with reference to FIG. 17) that extracts the fiber locations. In one implementation, the different LED colors (e.g., for fiber ends versus guides) allow the camera/computer to more readily distinguish between the guide patterns printed on the label and the lit fiber ends.

Scanner Data Processing

The scanned fiber data may be processed using a combination of imaging-processing and geometric-matching algorithms, which may tolerate both detection errors and wear and tear in the labels.

Figure 11:
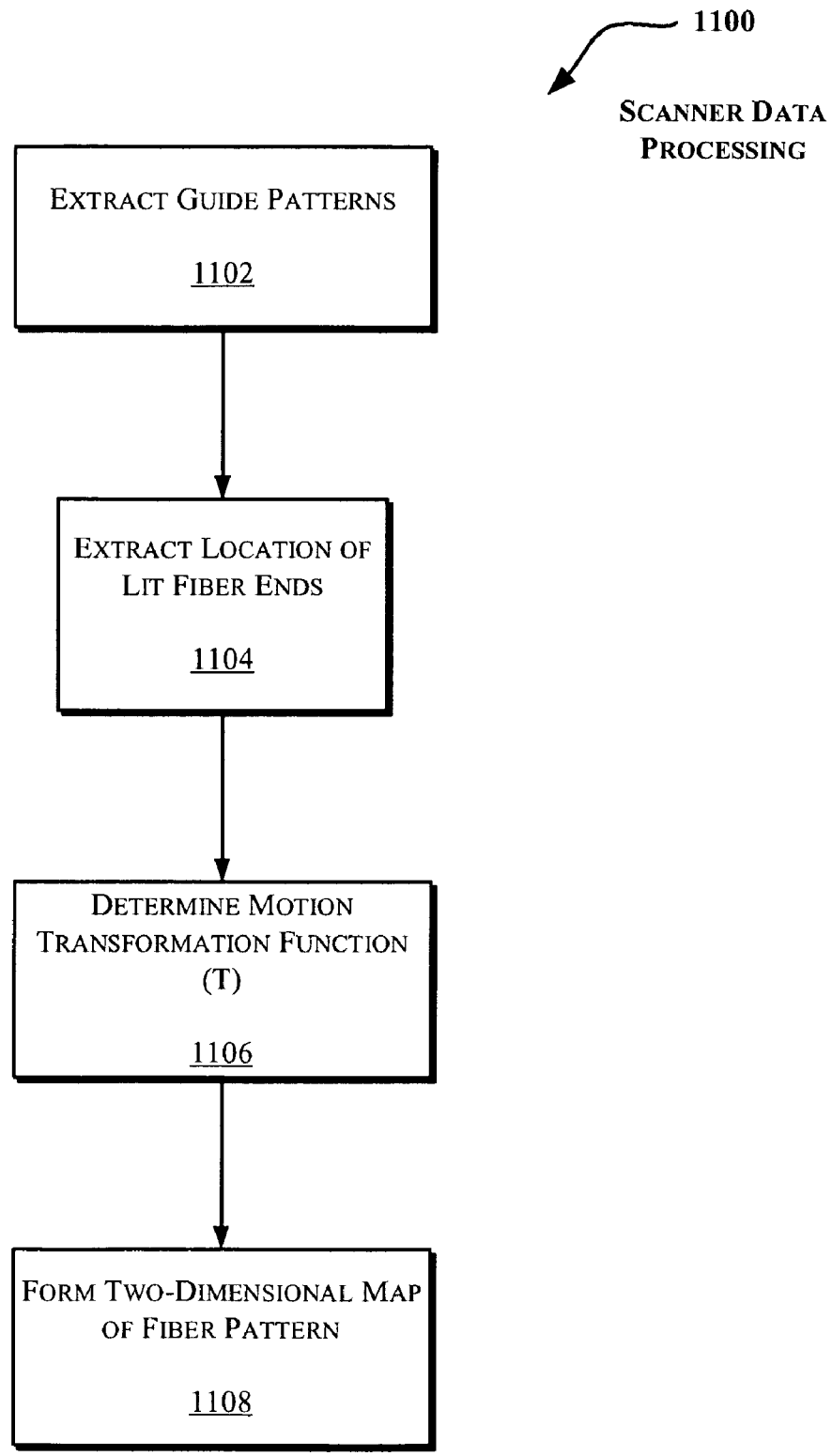
FIG. 11 illustrates an exemplary scanner data processing method.

FIG. 11 illustrates an exemplary scanner data processing method 1100. The method 1100 may be applied to one or more captured video images of the lit label (such as discussed with reference to FIG. 10). The guide patterns (1102) and the locations of the lit fiber ends (1104) are extracted from each video shot. As discussed with reference to FIG. 10, the use of separate illumination spectrums (e.g., green and red) simplifies and speeds up the extraction of fiber ends and the guide patterns in an implementation.

An accurate motion transform T may be determined based on the extracted data (1106). The transformation function T is envisioned to capture the relative motion of the camera between two shots and determines how the samples in one shot are mapped in to the coordinate system of the previous shot. The results of successive shots (e.g., two shots) may be correlated and a single consistent map of points may be built (1108). The two-dimensional map of the fiber pattern may be formed by stitching together successive camera shots. This produces a sequence of camera shots of the right-side ends of those fiber strands whose left-side ends are just under the illumination stripe. As long as the frame rate in the camera is comparable to the speed of movement of the scanner, most or all fiber openings will be captured by this method.

Figure 12:
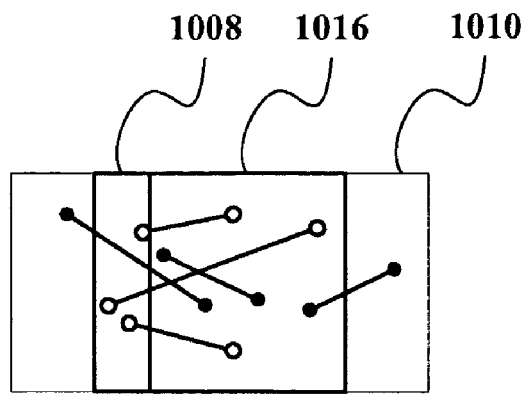
FIGS. 12 and 13 show two extracted successive camera shots of the same label.
Figure 13:
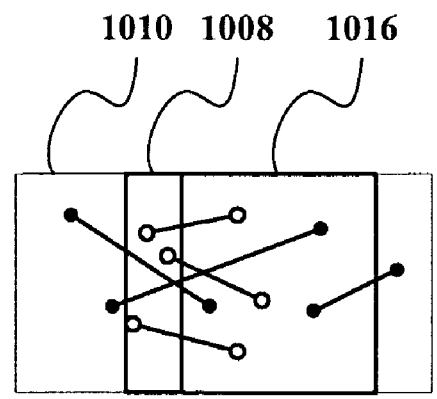
Figure 14:
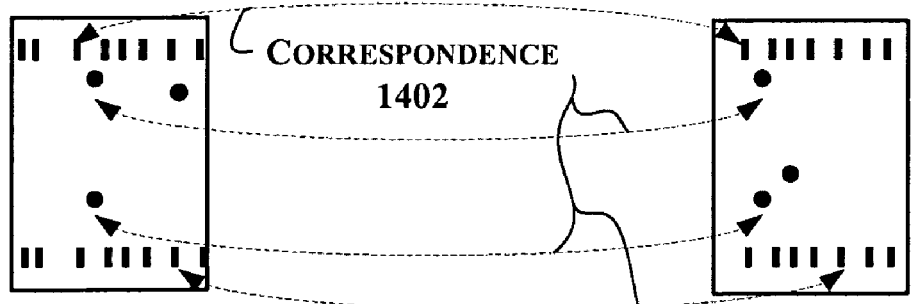
FIG. 14 illustrates the correspondence of extracted data points of the shots of FIGS. 12 and 13.

FIGS. 12 and 13 show two extracted successive camera shots of the same label 1010. FIGS. 12 and 13 each illustrate the illumination and imaging windows (1008 and 1016, respectively). FIG. 14 illustrates the correspondence of extracted data points of the shots of FIGS. 12 and 13. The two shots (FIGS. 12 and 13) each capture three fiber openings, two of which are from the same fiber strands (e.g., as marked by the dashed arrows 1402 of FIG. 14). Similarly, as illustrated, correspondence also exists between pairs of guide marks in these two shots.

From the extracted data, the motion transformation T between the two successive camera shots (such as those of FIGS. 12 and 13) may be determined (stage 1106 of FIG. 11). The transformation function T captures the relative motion of the camera between two shots and determines how the samples in one shot are mapped in to the coordinate system of the previous shot.

For example, given N successive camera shots, each captures a set of points $Q_k = \{P^k{}_1, P^k{}_2, \ldots\}$, where $k = 1 \ldots N$, and N−1 motion transformations $T_{k \to k+1}$, where $k = 1 \ldots N-1$, all points may be transformed into a global coordinate system. Without loss of generality, the coordinate system of the first camera shot may be chosen as the global coordinate system. Every point in point set $Q_k$, $k > 1$, is transformed into this coordinate system using the following formula:

$$p_j' = T_{1 \to 2}(T_{2 \to 3}(\ldots T_{N-1 \to N}(P_j)))\quad\text{(Formula 1)}$$

Given enough points shared between two successive camera shots, the camera motion transformation function T may be deduced as follows. Suppose two successive camera shots capture two sets of fiber openings (points), $Q_1$ and $Q_2$, each consisting of a set of points, expressed with a two-dimensional coordinate:

$$Q_1 = \{(x^1{}_1, y^1{}_1), \ldots, (x^1{}_m, y^1{}_m)\}$$

$$Q_2 = \{(x^2{}_1, y^2{}_1), \ldots, (x^2{}_n, y^2{}_n)\}$$

Given a matching tolerance δ, a camera motion transformation T and a non-empty matching M may be found, where M consists of a one-to-one matching from a subset of $P_1$ to an equal-sized subset of $P_2$:
$M = \{(x^1{}_{j1}, y^1{}_{j1}) \to (x^2{}_{k1}, y^2{}_{k1}), \ldots, (x^1{}_{jL}, y^1{}_{jL}) \to (x^2{}_{kL}, y^2{}_{kL})\}$,
where $(x^1{}_{ji}, y^1{}_{ji}) \in P_1$ and $(x^2{}_{ki}, y^2{}_{ki}) \in P_2$, for all $1 \leq I \leq L$, L=size of M, such that $\|T(x^1{}_{ji}, y^1{}_{ji}), (x^2{}_{ki}, y^2{}_{ki})\| < \delta$, where $\|(x,y),(u,v)\|$ is the L2 Euclidean distance between two points (x,y) and (u,v).

From the matching M, the parameters of the motion transformation T may be estimated, which can be described as a 3×3 affine matrix:

$$T = \begin{pmatrix} R_{11} & R_{12} & T_x \\ R_{21} & R_{22} & T_y \\ t_1 & t_2 & 1 \end{pmatrix}$$

The $R_{ij}$ parameters capture the relative rotation of the camera between the shots, the $T_x$ and $T_y$ indicate the parameters of the horizontal and vertical translations of the camera. The $t_1$ and $t_2$ parameters capture the slight tilt of the camera with respect to the label surface. When the scanner is pressed against a flat label surface, these two parameters can be considered to be zero.

To transform the samples from the second camera shot to the coordinate system of the first shot, the transformation matrix T may be multiplied by the sample's coordinate:

$$\begin{pmatrix} X^{1'}_{k1} \\ Y^{1'}_{k1} \\ 1 \end{pmatrix} = T \cdot \begin{pmatrix} X^2_{k1} \\ Y^2_{k1} \\ 1 \end{pmatrix}$$

Due to the matching M between $Q_1$ and $Q_2$, the following linear equation results:

$$\begin{pmatrix} X^2_{j1} \\ Y^2_{j1} \\ 1 \end{pmatrix} = T \cdot \begin{pmatrix} X^2_{k1} \\ Y^2_{k1} \\ 1 \end{pmatrix}$$

Since a tilt-free transformation matrix T contains six free parameters, only three pairs of matching points between two shots are needed to compute the motion transform. Guide patterns may be placed on the label to provide enough pairs of matching points, so that the scanner can tolerate the situation where only one or two fiber openings are shared between two successive camera shots.

Once an accurate motion transform T is found, the results of two successive shots $Q_1$ and $Q_2$ may be correlated and a single consistent map of points may be built. This process may be performed over all camera shots during a scan, shown by (Formula 1). The end result is a single, consistent map of all fiber ends (right-side) in a label. Although the same scanning process can be applied in the reverse direction to obtain the left-side fiber ends, a map of right-side fiber ends may provide sufficient anti-counterfeiting resistance.

Verification Procedure

During the label production stage (e.g., as discussed with reference to FIGS. 5 and 6), a scanner produces a reference single map of fiber ends. This map may be compressed as will be further discussed below with respect to the section entitled "fiber data compression" and cryptographically encoded as the medium certificate. During the label verification stage (such as discussed with reference to FIG. 8), the scanning procedure may be applied once again to produce a second map of the underlying fiber pattern. The same point-matching method (such as discussed with reference to FIG. 11) may be applied to determine whether two maps describe the same fiber pattern.

Figure 15:
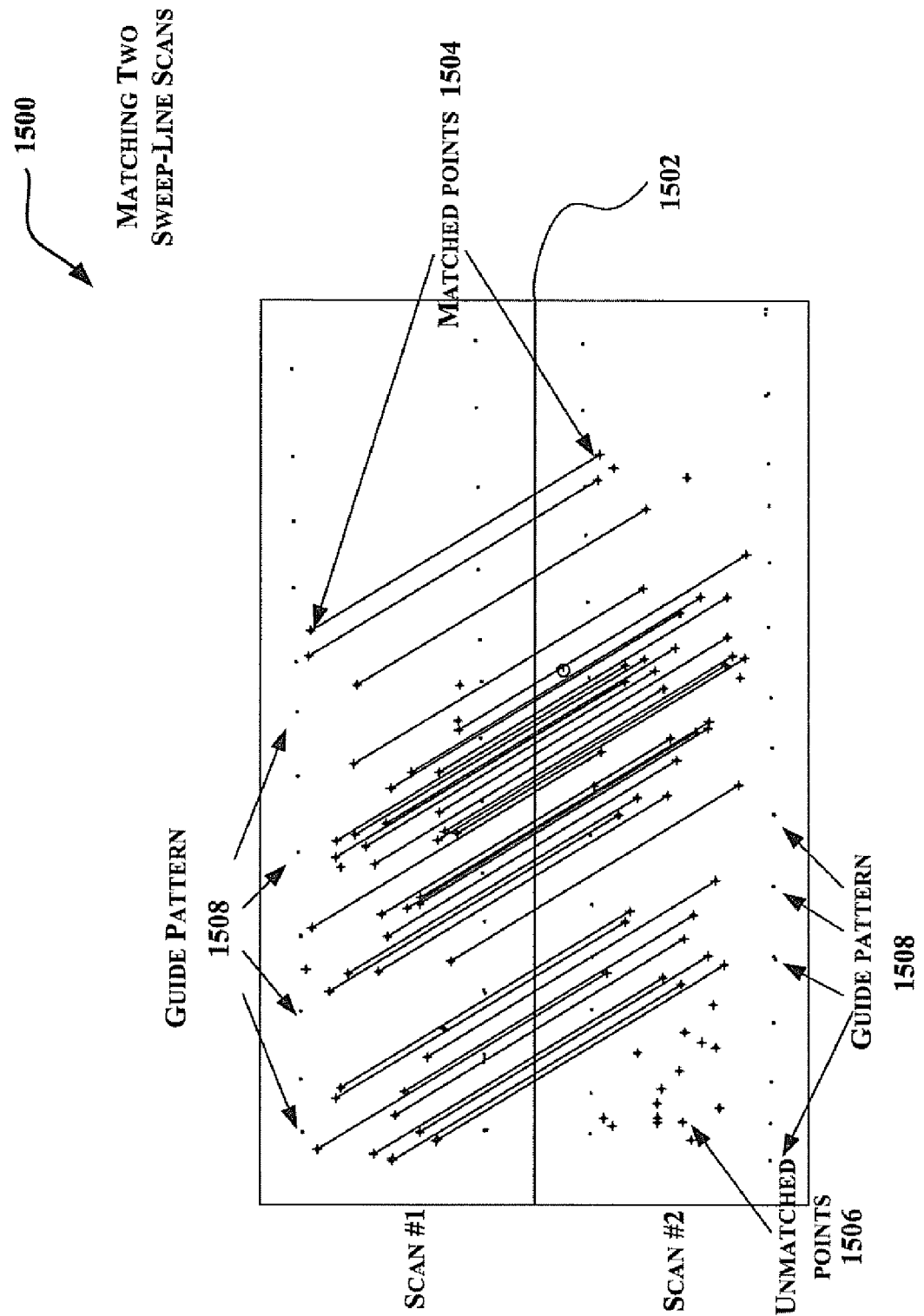
FIG. 15 shows the point-matching results from two separate sweep-line scans of an optical-fiber label.

FIG. 15 shows the point-matching results 1500 from two separate sweep-line scans of an optical-fiber label (separated by line 1502). The points marked by crosses are fiber openings captured by the detector. The lines connecting the crosses above and below the line (1502) denote the geometric matching between the two maps of captured fiber ends (1504). FIG. 15 also includes unmatched fiber openings (1506) and guide patterns (1508).

A high matching percentage above a pre-defined threshold (i.e., the decision threshold) indicates that the label is genuine; a low matching percentage indicates counterfeit. In an implementation, the point-matching percentage between two scans of the same label (i.e., the positive-matching rate) typically ranges between 70% and 85%; while the matching percentage between scans of two different labels (i.e., the negative-matching rate) is around 10%-15%. The variance is typically around 2-5%. This indicates that the decision threshold can be chosen somewhere around 50% that results in a false-positive rate of less than $1.2 \cdot 10^{-12}$ and a false-negative rate of less than $2.9 \cdot 10^{-7}$.

The false-positive and false-negative rates can be further reduced without much change to the system. One major contributor to matching errors is the camera lens' intrinsic distortion. Using software calibration to mitigate a camera's distortions is beneficial. Also, existing camera calibration techniques may be applied to improve the positive matching rate to the neighborhood of 95% and reduce the negative-matching rate down to around 5%.

Moreover, in an implementation, the scanner system described herein requires only a consumer-grade personal computer (PC) camera that currently costs in the range of $30 to $50. Alternatively, one can use a stationary camera with very high resolution to cover the entire label surface. In practice, however, this arrangement may result in an expensive scanner system as the high-resolution cameras generally cost several orders of magnitude more expensive than low-resolution PC cameras. Furthermore, in order to process high-volume video data from a stationary high-resolution camera in real time, the scanner system may require a powerful processor, further increasing the total system cost.

Additionally, there are many ways to process the capture data from a sweep-line scanner. One sophisticated approach would match the positions of the captured fiber ends to the position of the scanner at the time of the capture. This in fact produces a map of fibers whose "dimension" is very close to three. The reason being that of the two openings of a single fiber strand, the position of right-side one is recorded accurately (two-dimensional) and that of the other is roughly recorded by the position of the scanner. Since the illumination stripe has a certain width, the horizontal position of the left-side opening is captured to an approximation whose error is equal to the half width of the illumination stripe. Therefore, the narrower the illumination stripe, the closer the dimension of the capture data approaches three. Accordingly, the map of the label features may have a dimension of about two, three, or four.

In a further implementation, instead of obtaining the near-three-dimensional map, a two-dimensional map of the right-side fiber ends may be calculated. Even though the mapping thus obtained is a two-dimensional point set, the nature of the scanning motion provides sufficient guarantee that cheap counterfeiting attempts (e.g., short of emulating the fiber strands) will not pass the verification (such as discussed with reference to FIG. 8).

Fiber Data Compression

Figure 16:
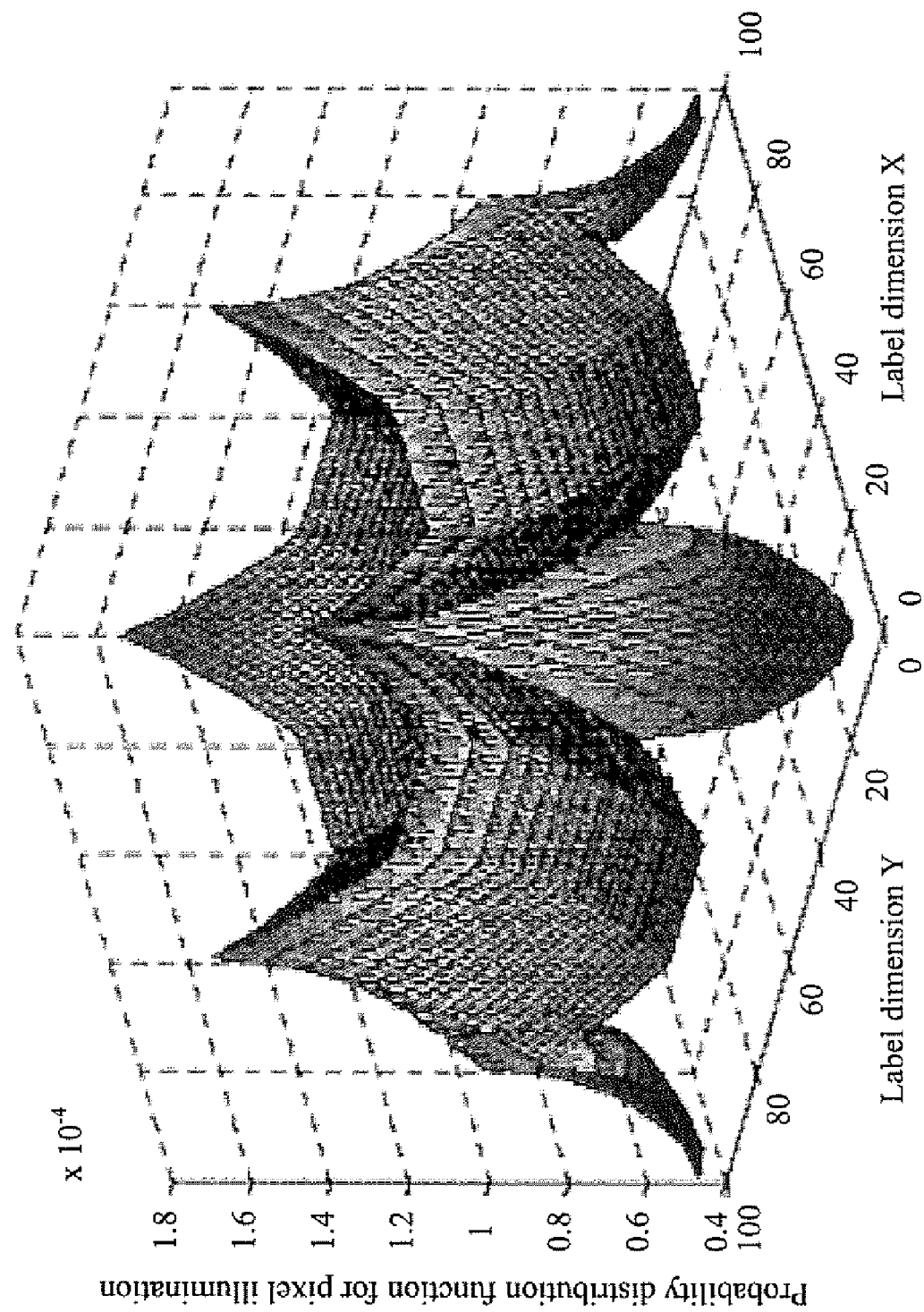
FIG. 16 illustrates an exemplary numerically computed point distribution function for a square label scanned with a 100×100 pixel matrix and a fiber length that corresponds to 20 pixels.

In various implementations, two classes of algorithms may be used that compress fiber locations on a given label. Both of the algorithm classes consist of three stages:

1. Computing the PDF. [both classes] Compute the probability distribution function (PDF) for pixel illumination across label's real estate. This stage is dependent upon the manufacturing process and the expected distribution of fibers over label's area. The PDF can be computed analytically to estimate system behavior prior to manufacturing. However, for best results, the output of the manufacturing line should be statistically analyzed to compute an accurate PDF. An example of a numerically computed PDF for a square label scanned with a 100×100 pixel matrix and a fiber length that corresponds to 20 pixels in illustrated in FIG. 16.

2. Point-to-Point Vector Encoding.

a. [class I] Vectors between fiber end-points may be encoded to use as few as possible bits. Each vector may be independently encoded using an arithmetic coder. For a given "anchor" pixel A in the label's area, a vector that points to another distinct pixel in the area in the following way may be encoded. All pixels (distinct from A) in the area are sorted in the descending order of their distance from A. Pixels that are at the same distance are sorted according to their likelihood that they are illuminated. The pixels in the sorted list may be denoted as $P=\{P_1 \ldots P_n\}$. Each pixel $P_i$ may be encoded in the sorted list using a number of bits that is equal to the log-likelihood that $P_i$ is the first or second illuminated pixel in P.

b. [class II] It is assumed that there is a path through all illuminated pixels in the label. The path is a list of vectors, where the destination of one vector is the source of the subsequent vector. For K closest illuminated pixels of a given illuminated pixel A, all K(K−1) vector tuples may be built that have A as the destination of the first vector in the tuple, and destination in the second vector in the tuple. For a given first vector in the tuple, the next vector is encoded in the following way. B is denoted as the source pixel of the first vector in the tuple. All pixels that are closer to B than A may be excluded from encoding and the remaining pixels in label's area may be sorted into a list P as in the case of the class I encoder. Then, a pixel $P_i$ from P may be encoded using a number of bits that is equal to the log-likelihood that $P_i$ is the first illuminated pixel in P.

3. Finding Longest Path that can be Described Using a Limited Bit Budget.

a. [class I] The optimization problem may be modeled as a variant of the asymmetric traveling salesman problem. The problem is modeled using a graph G; each node represents an illuminated pixel; the weight on each edge between two nodes represents the number of bits used to represent that vector. A path in G is desired, such that for a limited bit budget, as many as possible nodes are visited. This is an NP-hard problem (i.e., the complexity class of decision problems that are intrinsically harder than those that can be solved by a nondeterministic Turing machine in polynomial time).

b. [class II] The optimization problem may be modeled as another variant of the asymmetric traveling salesman problem. The model is similar to the class-I model with the exception that the edge weights change depending on the path taken according to the description of the class-II encoding scheme. This is also an NP-hard problem.

The point-subset compression algorithm may be a key ingredient of the universal label system, because the price of forging a label is exponentially proportional to the compression ratio achieved by the encoding algorithm. The technique of class I achieves about 15-25% better compression ratio than straightforward compression techniques, and class II is expected to have an additional leap of 15-25% in compression ratio.

Hardware Implementation

Figure 17:
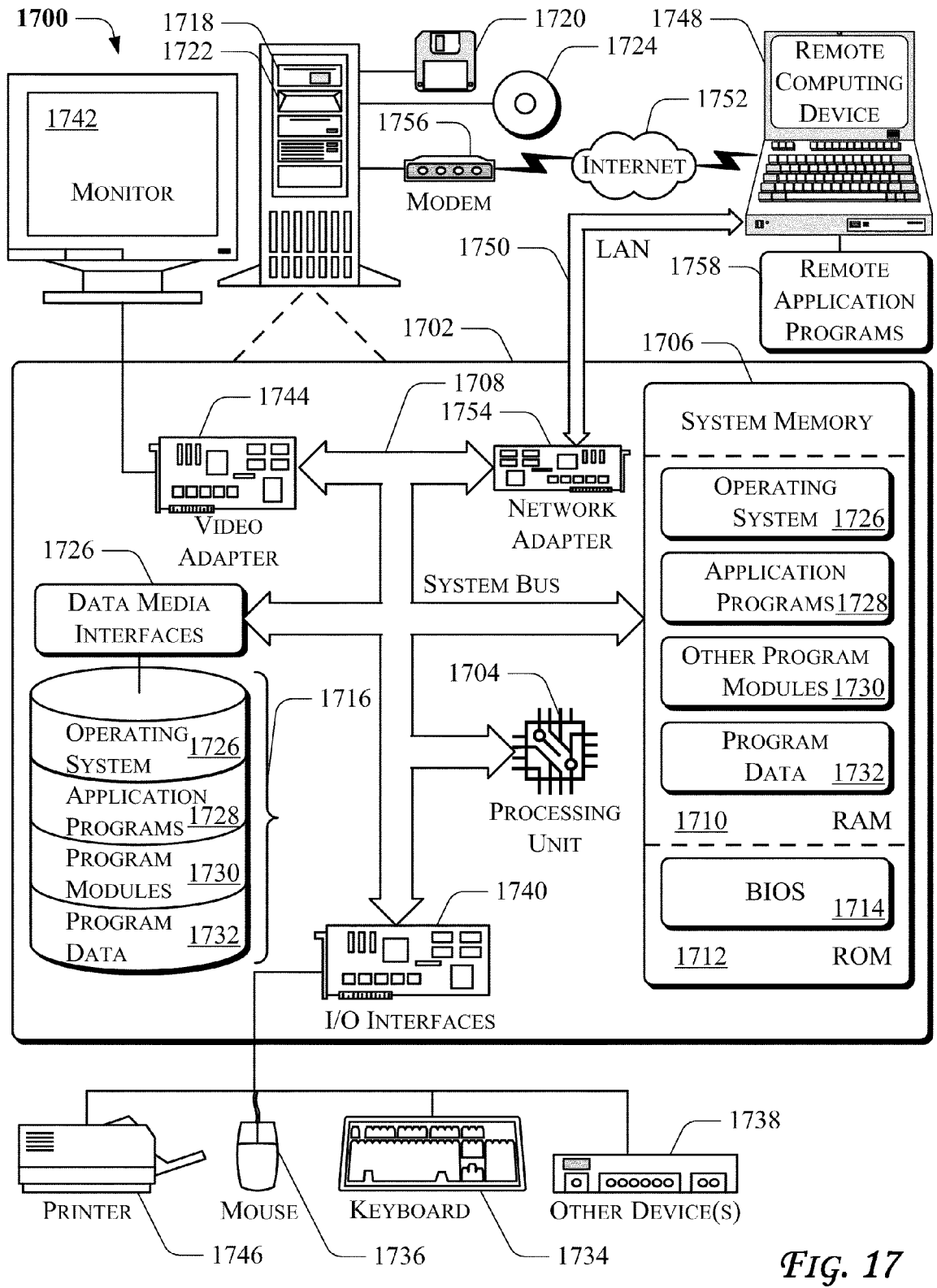
FIG. 17 illustrates a general computer environment, which can be used to implement the techniques described herein with respect to provision of counterfeit-resistant and/or tamper-proof labels using randomly-embedded optical fibers.

FIG. 17 illustrates a general computer environment 1700, which can be used to implement the techniques described herein with respect to provision of counterfeit-resistant and/or tamper-proof labels using randomly-embedded optical fibers. The computer environment 1700 is only one example of a computing environment and is not intended to suggest any limitation as to the scope of use or functionality of the computer and network architectures. Neither should the computer environment 1700 be interpreted as having any dependency or requirement relating to any one or combination of components illustrated in the exemplary computer environment 1700.

Computer environment 1700 includes a general-purpose computing device in the form of a computer 1702. The components of computer 1702 can include, but are not limited to, one or more processors or processing units 1704 (optionally including a cryptographic processor or co-processor), a system memory 1706, and a system bus 1708 that couples various system components including the processor 1704 to the system memory 1706.

The system bus 1708 represents one or more of any of several types of bus structures, including a memory bus or memory controller, a peripheral bus, an accelerated graphics port (AGP), and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus (and its varieties such as a PCI Express bus), also known as a Mezzanine bus.

Computer 1702 typically includes a variety of computer-readable media. Such media can be any available media that is accessible by computer 1702 and includes both volatile and non-volatile media, removable and non-removable media.

The system memory 1706 includes computer-readable media in the form of volatile memory, such as random access memory (RAM) 1710, and/or non-volatile memory, such as read only memory (ROM) 1712. A basic input/output system (BIOS) 1714, containing the basic routines that help to transfer information between elements within computer 1702, such as during start-up, is stored in ROM 1712. RAM 1710 typically contains data and/or program modules that are immediately accessible to and/or presently operated on by the processing unit 1704.

Computer 1702 may also include other removable/non-removable, volatile/non-volatile computer storage media. By way of example, FIG. 17 illustrates a hard disk drive 1716 for reading from and writing to a non-removable, non-volatile magnetic media (not shown), a magnetic disk drive 1718 for reading from and writing to a removable, non-volatile magnetic disk 1720 (e.g., a "floppy disk"), and an optical disk drive 1722 for reading from and/or writing to a removable, non-volatile optical disk 1724 such as a CD-ROM, DVD-ROM, or other optical media. The hard disk drive 1716, magnetic disk drive 1718, and optical disk drive 1722 are each connected to the system bus 1708 by one or more data media interfaces 1726. Alternatively, the hard disk drive 1716, magnetic disk drive 1718, and optical disk drive 1722 can be connected to the system bus 1708 by one or more interfaces (not shown).

The disk drives and their associated computer-readable media provide non-volatile storage of computer-readable instructions, data structures, program modules, and other data for computer 1702. Although the example illustrates a hard disk 1716, a removable magnetic disk 1720, and a removable optical disk 1724, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1716, magnetic disk 1720, optical disk 1724, ROM 1712, and/or RAM 1710, including by way of example, an operating system 1726, one or more application programs 1728, other program modules 1730, and program data 1732. Each of such operating system 1726, one or more application programs 1728, other program modules 1730, and program data 1732 (or some combination thereof) may implement all or part of the resident components that support the distributed file system.

A user can enter commands and information into computer 1702 via input devices such as a keyboard 1734 and a pointing device 1736 (e.g., a "mouse"). Other input devices 1738 (not shown specifically) may include a microphone, joystick, game pad, satellite dish, serial port, scanner, and/or the like. These and other input devices are connected to the processing unit 1704 via input/output interfaces 1740 that are coupled to the system bus 1708, but may be connected by other interface and bus structures, such as a parallel port, a game port, or a universal serial bus (USB).

A monitor 1742 or other type of display device can also be connected to the system bus 1708 via an interface, such as a video adapter 1744. In addition to the monitor 1742, other output peripheral devices can include components such as speakers (not shown) and a printer 1746 which can be connected to computer 1702 via the input/output interfaces 1740.

Computer 1702 can operate in a networked environment using logical connections to one or more remote computers, such as a remote computing device 1748. By way of example, the remote computing device 1748 can be a personal computer, portable computer, a server, a router, a network computer, a peer device or other common network node, game console, and the like. The remote computing device 1748 is illustrated as a portable computer that can include many or all of the elements and features described herein relative to computer 1702.

Logical connections between computer 1702 and the remote computer 1748 are depicted as a local area network (LAN) 1750 and a general wide area network (WAN) 1752. Such networking environments are commonplace in offices, enterprise-wide computer networks, intranets, and the Internet.

When implemented in a LAN networking environment, the computer 1702 is connected to a local network 1750 via a network interface or adapter 1754. When implemented in a WAN networking environment, the computer 1702 typically includes a modem 1756 or other means for establishing communications over the wide network 1752. The modem 1756, which can be internal or external to computer 1702, can be connected to the system bus 1708 via the input/output interfaces 1740 or other appropriate mechanisms. It is to be appreciated that the illustrated network connections are exemplary and that other means of establishing communication link(s) between the computers 1702 and 1748 can be employed.

In a networked environment, such as that illustrated with computing environment 1700, program modules depicted relative to the computer 1702, or portions thereof, may be stored in a remote memory storage device. By way of example, remote application programs 1758 reside on a memory device of remote computer 1748. For purposes of illustration, application programs and other executable program components such as the operating system are illustrated herein as discrete blocks, although it is recognized that such programs and components reside at various times in different storage components of the computing device 1702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may include "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   encoding a plurality of features of a label as a medium certificate, wherein the plurality of features comprise a map of the plurality of label features formed by a process comprising:
   obtaining at least two shots of the label;
   extracting data from the label shots, wherein the extracted data comprises coordinates of a plurality of optical fiber strands present on the label;
   determining a motion transformation function of the extracted data; and
   printing the medium certificate on the label.

2. A method as recited in claim 1 wherein the multi-dimensional map of the plurality of label features has a dimension selected from a group comprising about two, three, and four.

3. A method as recited in claim 1 wherein data regarding the plurality of label features is compressed prior to encoding.

4. A method as recited in claim 1 wherein the extracted data comprises data selected from a group comprising guide pattern coordinates and lit fiber end coordinates.

5. A method as recited in claim 1 wherein the plurality of label features further comprise one or more features from a group of features comprising optical fiber length, optical fiber curvature, optical fiber relative light intensity, optical fiber florescence, optical fiber color, and optical fiber thickness.

6. A method as recited in claim 1 further comprising providing identifying indicia corresponding to the medium certificate.

7. A method as recited in claim 6 wherein the identifying indicia is provided with the label.

8. A method as recited in claim 6 wherein the identifying indicia is provided with the label and the identifying indicia is one or more items selected from a group of items comprising a bar code and an RFID.

9. A method comprising:
   obtaining an identifying indicia corresponding to a medium certificate, the medium certificate having been encoded based on a plurality of features of a label;
   decoding the medium certificate to obtain the plurality of features of the label;
   verifying the identifying indicia against the plurality of features of the label, wherein the plurality of label features comprise coordinates of a plurality of optical fiber strands present on the label and wherein the verifying comprises:
   obtaining at least two shots of the label;
   extracting data from the label shots;
   determining a motion transformation function of the extracted data; and
   forming a multi-dimensional map of the plurality of label features.

10. A method as recited in claim 9, the verifying further comprising determining whether the label is genuine.

11. A method as recited in claim 9 wherein the medium certificate is decoded using a public key.

12. A method as recited in claim 9 wherein the identifying indicia is provided with the label.

13. A method as recited in claim 9 wherein the plurality of label features further comprise one or more features selected from a group of features comprising optical fiber length, optical fiber curvature, optical fiber relative light intensity, optical fiber florescence, optical fiber color, and optical fiber thickness.

14. A method as recited in claim 9 wherein the identifying indicia is provided with the label and the identifying indicia is one or more items selected from a group of items comprising a bar code and an RFID.

15. A method as recited in claim 9 wherein the identifying indicia is obtained from a remote source.

16. A method as recited in claim 9 wherein the identifying indicia is obtained from a remote source comprising a database.

17. A method as recited in claim 9 wherein the multi-dimensional map of the plurality of label features has a dimension selected from a group comprising about two, three, and four.

18. A method as recited in claim 9 wherein the extracted data comprises data selected from a group comprising guide pattern coordinates and lit fiber end coordinates.

19. A system comprising:
   a label scanner to scan a label comprising a medium certificate; and
   a medium scanner to scan a plurality of features of the label, the plurality of features of the label comprising coordinates of a plurality of optical fiber strands present on the label, the medium scanner configured to facilitate verification of identifying indicia against the plurality of features of the label via operations comprising:
   obtaining at least two shots of the label;
   extracting data from the label shots;
   determining a motion transformation function of the extracted data; and
   forming a multi-dimensional map of the plurality of label features.

20. A system as recited in claim 19 wherein:
   in an event the medium certificate is decoded and the decoded medium certificate matches the scanned plurality of the label features by the verification medium scanner, the label is declared as genuine; and
   in an event the medium certificate is decoded and the decoded medium certificate does not match the scanned plurality of the label features by the verification medium scanner, the label is declared as counterfeit.

\* \* \* \* \*